United States Patent
Rasmussen

(10) Patent No.: US 8,898,187 B2
(45) Date of Patent: *Nov. 25, 2014

(54) DEFAULT LOCATION THAT MAY BE DYNAMICALLY CHANGED

(75) Inventor: David J. Rasmussen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,099

(22) Filed: Nov. 17, 2011

(65) Prior Publication Data

US 2012/0066631 A1 Mar. 15, 2012

Related U.S. Application Data

(63) Continuation of application No. 11/360,154, filed on Feb. 23, 2006, now Pat. No. 8,065,351.

(51) Int. Cl.
*G06F 17/30* (2006.01)

(52) U.S. Cl.
CPC .............................. *G06F 17/30067* (2013.01)
USPC ....................................................... 707/769

(58) Field of Classification Search
None
See application file for complete search history.

(56) References Cited

U.S. PATENT DOCUMENTS

| | | | |
|---|---|---|---|
| 5,813,009 A | 9/1998 | Johnson et al. ......................... 1/1 |
| 5,916,300 A * | 6/1999 | Kirk et al. ...................... 701/468 |
| 6,098,072 A | 8/2000 | Sluiman et al. ................ 707/103 |
| 6,301,708 B1 | 10/2001 | Gazdik et al. ..................... 717/11 |
| 6,370,538 B1 | 4/2002 | Lamping et al. ............... 707/102 |
| 6,438,749 B1 | 8/2002 | Chamberlain ................. 717/174 |
| 6,592,628 B1 * | 7/2003 | Prinzing ........................ 715/209 |
| 6,727,923 B1 | 4/2004 | McInerney ..................... 345/847 |
| 6,904,424 B1 | 6/2005 | Gusler et al. ....................... 707/1 |
| 6,965,904 B2 | 11/2005 | Bankert et al. .............. 707/104.1 |
| 7,162,387 B2 | 1/2007 | Johnson et al. ............... 702/123 |
| 2002/0169796 A1 | 11/2002 | Schwartz .................... 707/500.1 |
| 2003/0140115 A1* | 7/2003 | Mehra ........................... 709/217 |
| 2003/0182323 A1* | 9/2003 | Demsky et al. ............... 707/203 |
| 2004/0040017 A1 | 2/2004 | Kershenbaum et al. ....... 717/158 |

(Continued)

FOREIGN PATENT DOCUMENTS

| | | |
|---|---|---|
| WO | WO 2005/022536 A3 | 3/2005 |
| WO | WO 2005/111784 A2 | 11/2005 |

OTHER PUBLICATIONS

"WAP Client Overview", http://www.sowandpigs.co.uk/mailtest/cdga/Cdga0800.html, last accessed Jan. 10, 2006, 7 pgs.

(Continued)

*Primary Examiner* — Neveen Abel Jalil
*Assistant Examiner* — Kellye Buckingham
(74) *Attorney, Agent, or Firm* — Mike Allen; Leonard Smith; Micky Minhas

(57) ABSTRACT

Content that is received by an application is delivered to a default location that may be dynamically updated. This default location for content may be updated without interfering with the functionality of a process or application that interacts with the default location. An API allows processes to request the current location of default location and then send and access content at the default location. A user interface allows a user to change the default location within a file system. The default location may be local to a computing device or remote from the computing device.

20 Claims, 7 Drawing Sheets

(56) References Cited

U.S. PATENT DOCUMENTS

| | | |
|---|---|---|
| 2004/0111582 A1 | 6/2004 | Maeda et al. ............... 711/202 |
| 2004/0243381 A1 | 12/2004 | Kuturianu et al. ............ 703/22 |
| 2005/0169062 A1* | 8/2005 | Kondo et al. ............ 365/189.05 |
| 2005/0240635 A1 | 10/2005 | Kapoor et al. ............... 707/200 |
| 2005/0283457 A1 | 12/2005 | Sonkin et al. ................. 707/1 |
| 2006/0005001 A1 | 1/2006 | Sinha et al. ................... 713/1 |
| 2006/0036568 A1 | 2/2006 | Moore et al. ................... 707/1 |

OTHER PUBLICATIONS

"Changing the Default File Save Location in Mac Word 2004", http://wordprocessing.about.com/od/wordprocessingsoftware/qt/macfilelocation.htm, last accessed Jan. 10, 2006, 1 pg.

"How to Set Your Office Applications to Automatically Save Documents to your Home Directory on the Server", http://www.kent.k12.wa.us/KSD/IT/TSC/classroom/office/default_loc.doc, last accessed Jan. 10, 2006, 8 pgs.

* cited by examiner

DEFAULT LOCATION THAT MAY BE DYNAMICALLY CHANGED

RELATED APPLICATIONS

This application is a continuation of and claims priority to application Ser. No. 11/360,154, filed Feb. 23, 2006, entitled DEFAULT LOCATION THAT MAY BE DYNAMICALLY CHANGED, indicated to be issued as U.S. Pat. No. 8,065,351, on Nov. 22, 2011, which is hereby incorporated by reference.

BACKGROUND

An application receives content from a variety of sources. Currently, applications use a number of methods for deciding where to initially place content that is received. In one method an application may prompt the user each time content is received for a location to place the content. This method is constantly prompting and interrupting the user for a location to place the data. Another method creates a fixed default location for any content that is received by the application. This second method disregards the user's own filing method. A third method provides a way to manually set the destination for content that is received from a specific source. This method requires configuration for each of the data sources from which content may be received.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Content that is received by an application is delivered to a default location that may be dynamically updated. This default location for content may be updated without interfering with the functionality of a process or application that interacts with the default location. An application programming interface allows processes to request the current location of default location and then send content to the default location. A user interface may be provided that allows a user to change the default location within a file system. The default location may be local to a computing device or remote from the computing device. The default location removes the requirement for a process or a user to manually configure the default location for each of the processes that may deliver content to the default location.

DETAILED DESCRIPTION

Figure 1:
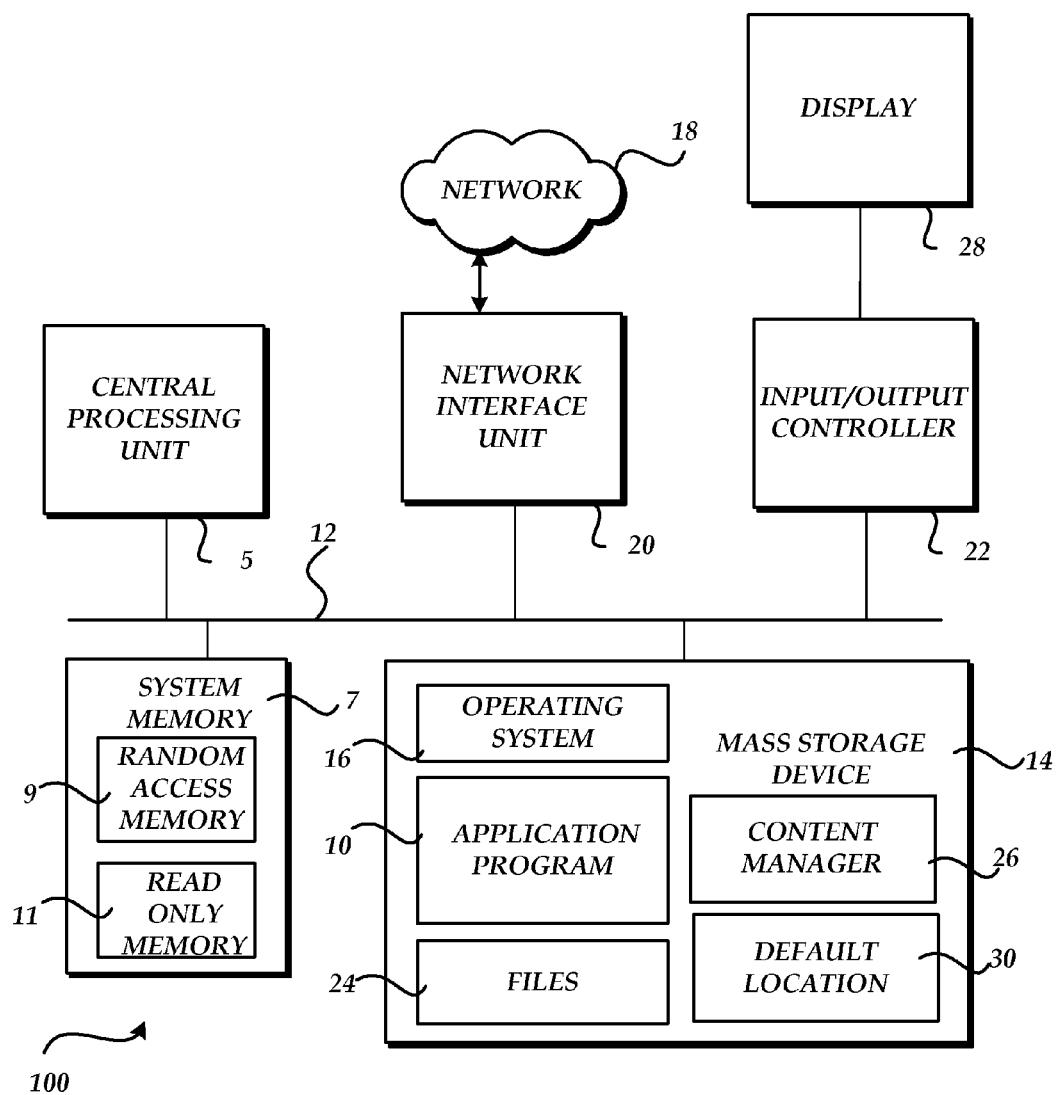
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, the computer 100 may operate in a networked environment using logical connections to remote computers through a network 18, such as the Internet. The computer 100 may connect to the network 18 through a network interface unit 20 connected to the bus 12. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store an application program 10. The application program 10 is operative to receive content from one or more internal and/or external processes and store the content at a default location. According to one embodiment, the application program 10 comprises the MICROSOFT ONENOTE application program from MICROSOFT CORPORATION. Other application programs that receive content that needs to be stored in a default location may also be utilized. For instance, email programs, browser programs, PIM programs, and the like may be utilized.

The application program 10 may utilize a content manager 26. As will be described in greater detail below, the content manager 26 may be used to provide functionality relating to the default location. For example, the content manager 26 may provide functionality for determining the location of the default location; placing content within the default location and changing the default location.

Figure 2:
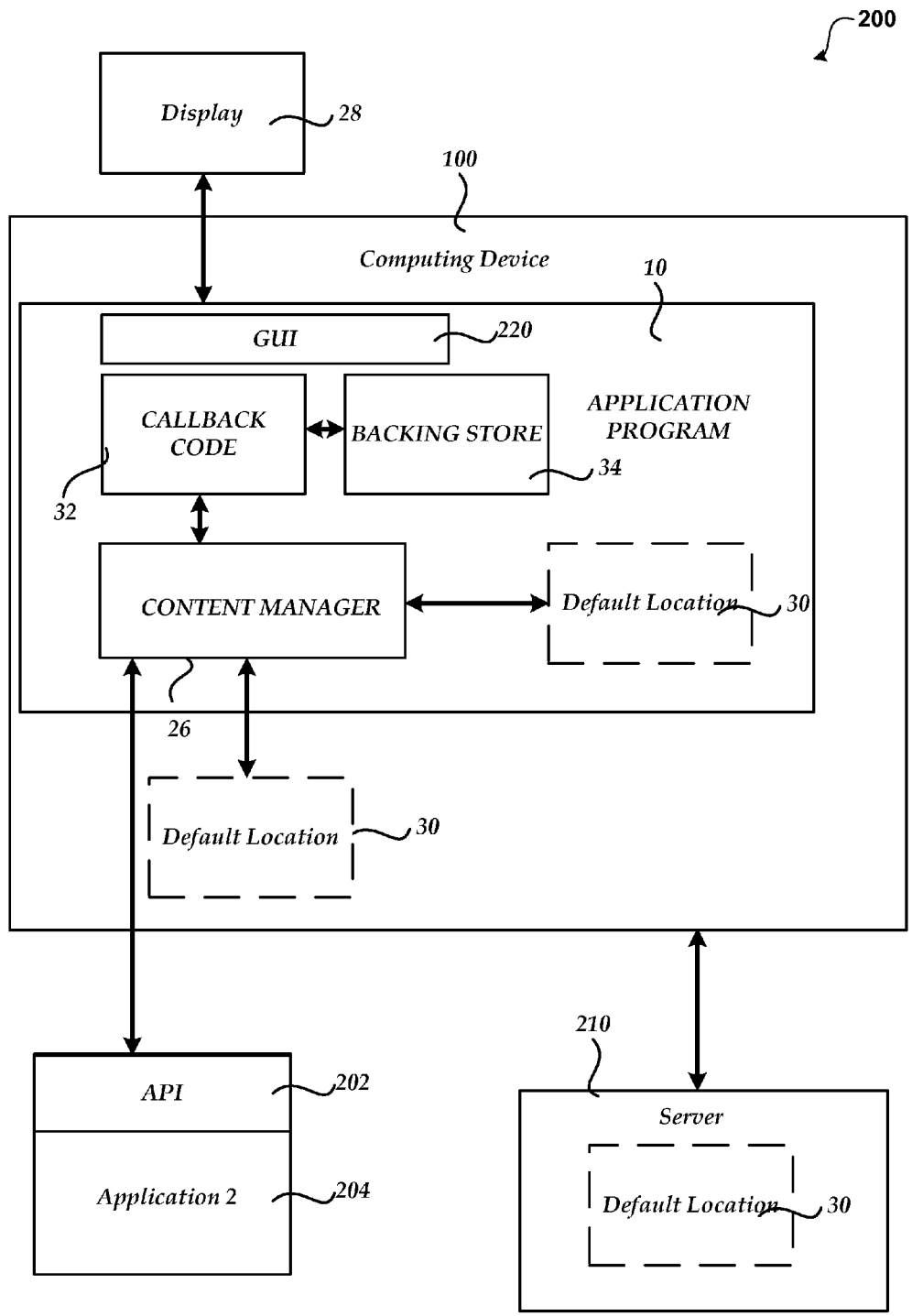
FIG. 2 shows a content system for directing content to a default location.

FIG. 2 shows an content system 200 for directing content to a default location. As illustrated, content system 200 includes computing device 100, application program 10, content manager 26, server 210, default location 30, callback code 32, backing store 34, graphical user interface (GUI) 220, display 28, API 202, and application 2 (204).

In order to facilitate communication with the content manager 26, one or more callback routines, illustrated in FIG. 2 as callback code 32 may be implemented. According to one embodiment, any content that is received by application program 10 and that is directed to the default location may be temporarily stored in a backing store 34. Alternatively, any content that is directed to a default location 30 that is associated with application program 10 may be stored directly at the default location 30.

A default location 30 allows features/applications/processes to deposit content that may be later specifically placed within an application, such as application 10. By having a defined default location for the content, the application 10 does not have to access different random folders and sections within a program such as MICROSOFT ONENOTE that have been individually created as a dumping ground for content. This uniformity of the default location assists users and processes in accessing the content that has placed within the default location such that these users and processes may easily find and manipulate the content that was sent to the application. The default location 30 provides a common model for how to deal with content that is directed to a default location.

The content manager 26 provides facilities for interacting with content that is received by application program 10 and that is directed toward a default location 30. Generally, a default location is specified as a temporary dumping ground for content until it may be processed by a user or some other process. For example, a default location may be used to temporarily store notes, files, and the like. An API 202 is provided to internal and external processes that may be used to perform actions relating to the default location. For example, the API 202 may provide functionality for determining the current location of the default location; changing the location of the default location; retrieving content from the default location; as well as sending content to the default location.

When a user and/or process changes the location of the default location 30 that is associated with application program 10, application 10 communicates these changes to content manager 26 such that the default location is updated. According to one embodiment, content manager 26 updates a registry key to include the updated path to the default location. For example, the default location may be changed from residing on computing device 100 to residing on server 210. As illustrated, the default location may be located within the application program 10 space, local to the computing device 100 of application program 10 or remotely from computing device 100.

A GUI 220 may also be used to move and/or specify the location of the default location. If the user moves the default location to another location by dragging and dropping the location (See FIG. 5), or using an edit box (See FIG. 4) or some similar method, then application 10 updates the location of the default location and redirects all content that is received to the newly updated default location. Content that is already located at the default location may either be moved to the new location or stay at the previous location. According to one embodiment, if the default location is deleted or absent, application 10 recreates it at the specified location.

According to one embodiment, a registration key specifies the path to the default location. An application, such as application 2 (204) may use API 202 to determine the location of the default location or may directly access the registration key to determine where the default location is located. The location of the default location may be stored many different ways. For example, the default location may be stored within a file at a known location, with application 10 or in some other manner.

Figure 3:
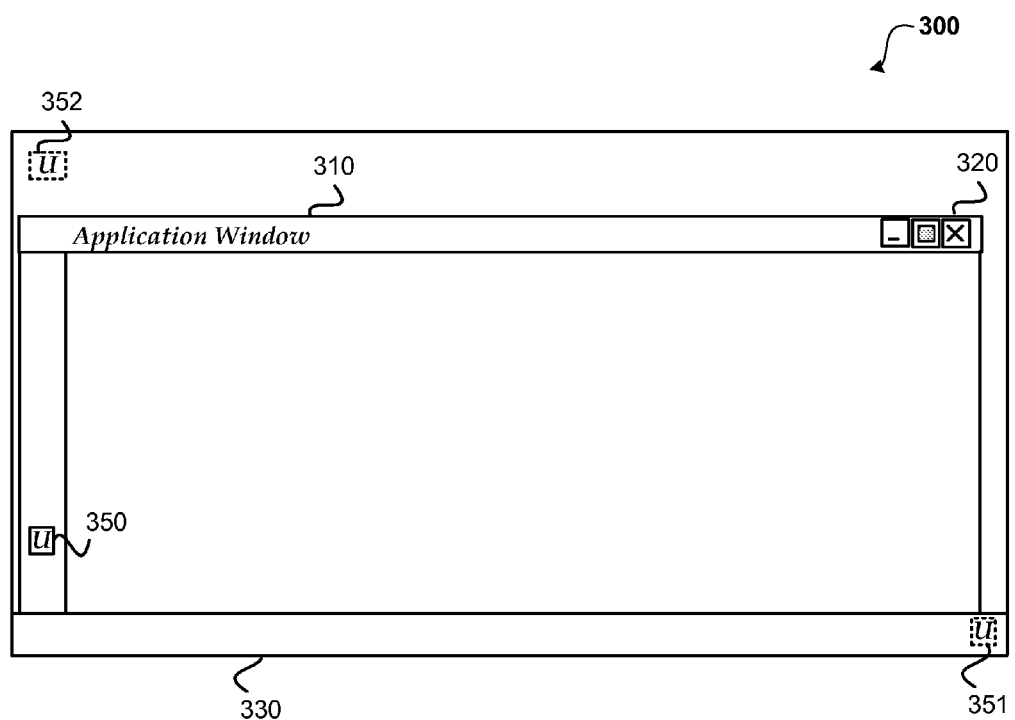
FIG. 3 illustrates an exemplary desktop window that includes an icon for accessing content that has been stored at a default location.

FIG. 3 illustrates an exemplary desktop window 300 that includes an icon for accessing content that has been stored at a default location. As illustrated, FIG. 3 includes desktop 300, application window 310, window elements 320, menu bar 330 and default content icons 350, 351 and 352.

Generally, a user may select a default content icon (e.g. default content icon 350) to navigate to the content by clicking on it. For example, when a default content icon is selected in the ONENOTE application, the application opens an unfiled section of the notebook that includes all of the content that has been sent to the default location. The content icon will access the content that is stored at the default location regardless of whether the default location has changed. For example, during one period of time the default location may be located at Location1 and during a second period of time, the default location may be located at Location2. Changing the default location does not cause an application to have to recompile or change a parameter or setting in order to access the content at the default location. The same function call may be used to retrieve the current default location.

According to one embodiment, the default content icon 350 is displayed on a menu bar that is located on the left side of application window 310. Other locations, however, may be used for the default content icon. For example, the default content icon may be displayed on the desktop as illustrated by default content icon 352. The default content icon may also be displayed within menu bar 330 as illustrated by default content icon 351. Many other locations may be used to display the default content icon. The three areas shown for the default content icon are merely representative.

Figure 4:
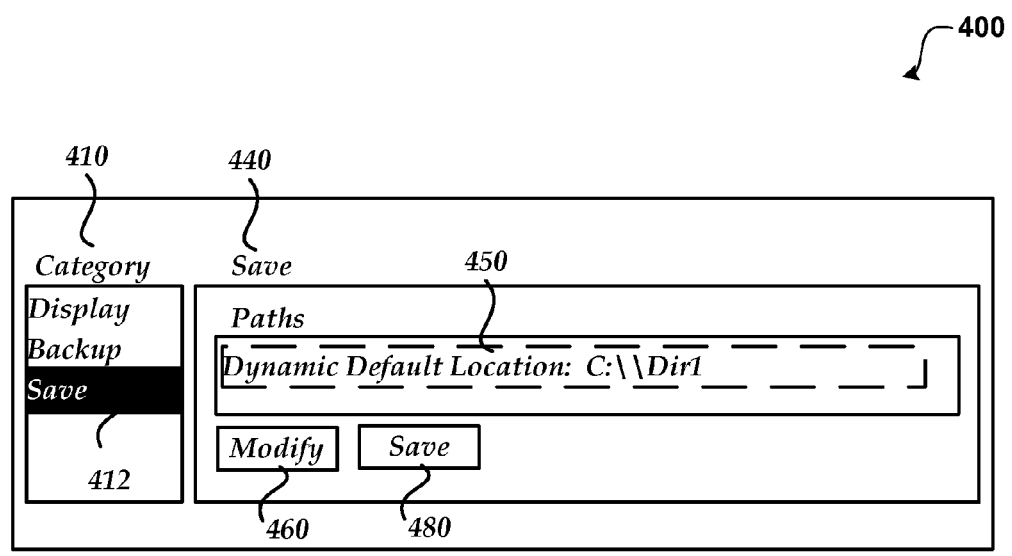
FIG. 4 shows a graphical user interface that may be used to dynamically change the default location.

FIG. 4 shows a graphical user interface (GUI) that may be used to change the default location dynamically. As shown, GUI 400 includes a category selection box 410, an edit box 450 to display and change a default location, a modify button 460 that may be used to indicate a change is desired and a save button 480.

Referring to GUI 400 a user has selected the save category 412. In response to the selection, edit box 450 displays the path to the default location. As discussed above, the path may be a path that is local to the computing device or a path that is remote to the computing device. The modify button 460 may be selected to make the text within edit box 450 editable such that the default location may be changed. Alternatively, the user may select the text within edit box 450 by placing their cursor within edit box 450 and highlighting the portion of the default location they would like to change. Once the user has made any desired edits, the user may select the save button 480 to save the change to the default location. In response to the save event, the default location is updated such that any requests for the default location that are received after the change has been made are provided with the updated default location. A change to the default location may be made at any time. For example, a change may be made whether or not the application is currently running.

Figure 5:
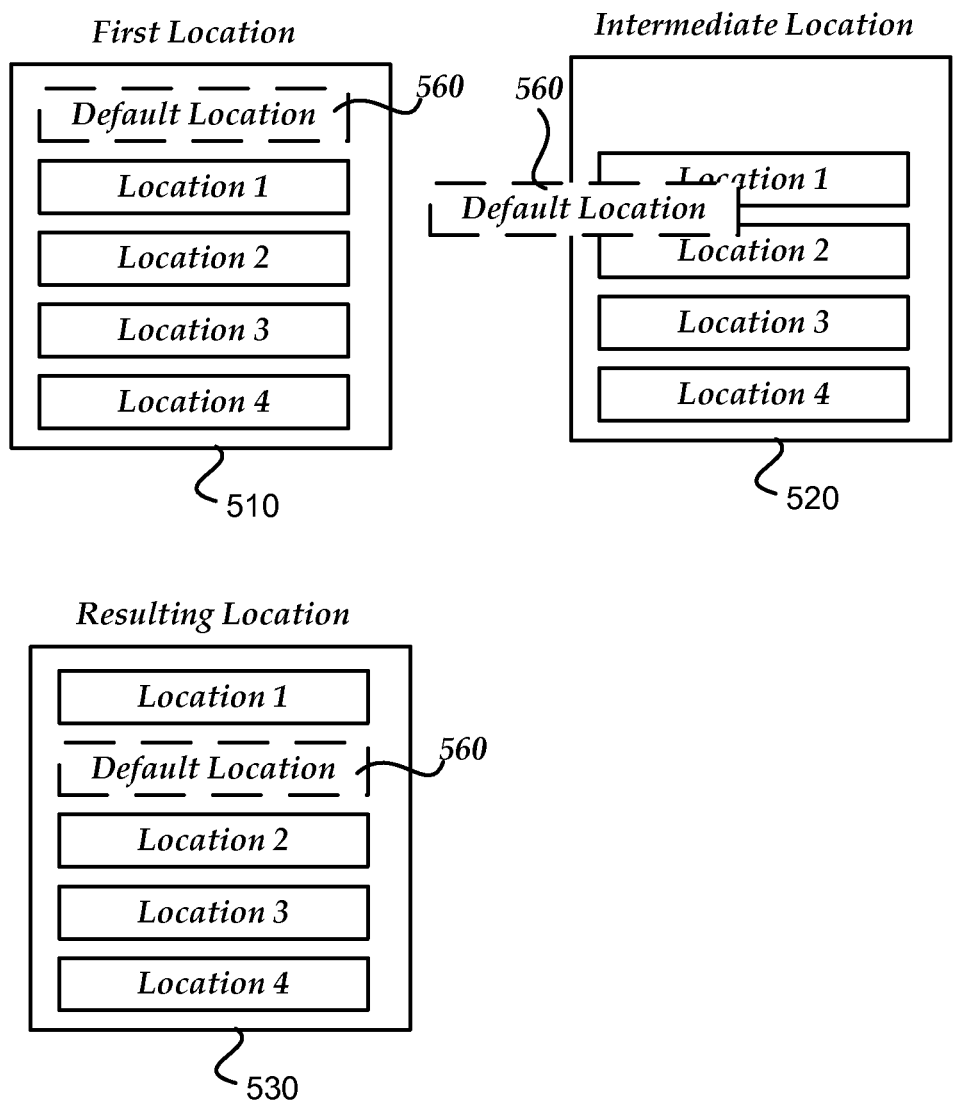
FIG. 5 illustrates dragging the default location to another location within a file system.

FIG. 5 illustrates dragging and dropping the default location to another location within a file system. As illustrated, FIG. 5 includes a first location window 510 that shows the default location 560 before being moved; an intermediate window 520 that shows the default location 560 being dragged to a new location; and the resulting location window 530 that shows the default location 560 dropped into a new location and updated.

Referring to first location window 510 it can be seen that the default location 560 is located within the file system before Location 1. Location 1 may be any location within a file system. The file system may show the local file system as well as the networked file systems. As such, Locations 1 through 4 may indicate local and/or remote file system locations.

Once the user has selected the default location 560 indicator, the default location may be dragged and dropped to any location within the file system. As illustrated in intermediate location window 520 the user has dragged the default location 560 to between Location 1 and Location 2.

Once the user releases the default location 560, the default location is updated to the specified location. In the present example, the default location 560 is updated to be between Location 1 and Location 2 as shown in resulting location window 530.

As discussed above, any application or process that interacts with the default location does not have to be updated to react to the change in the default location.

Figure 6:
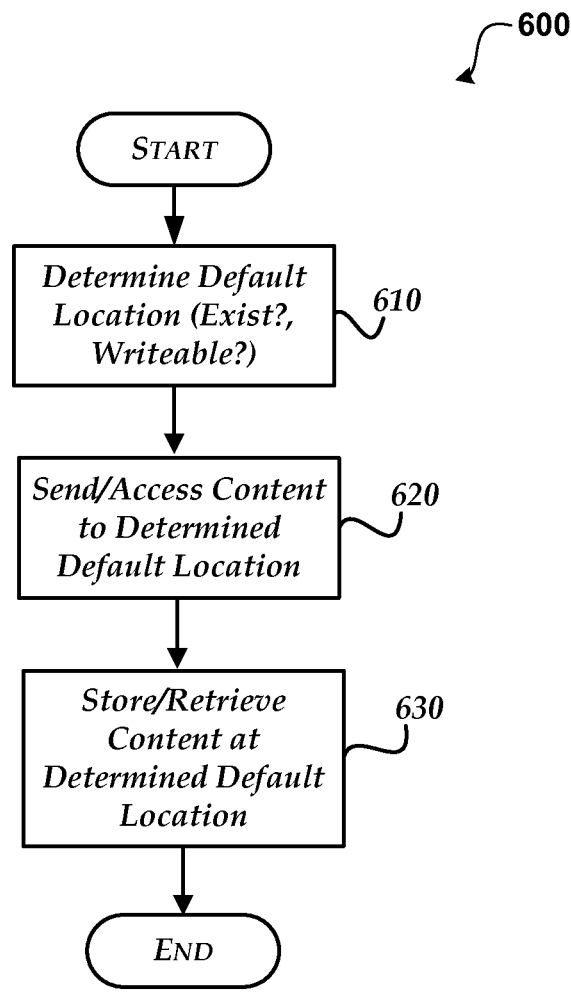
FIG. 6 illustrates determining and writing to a default location.
Figure 7:
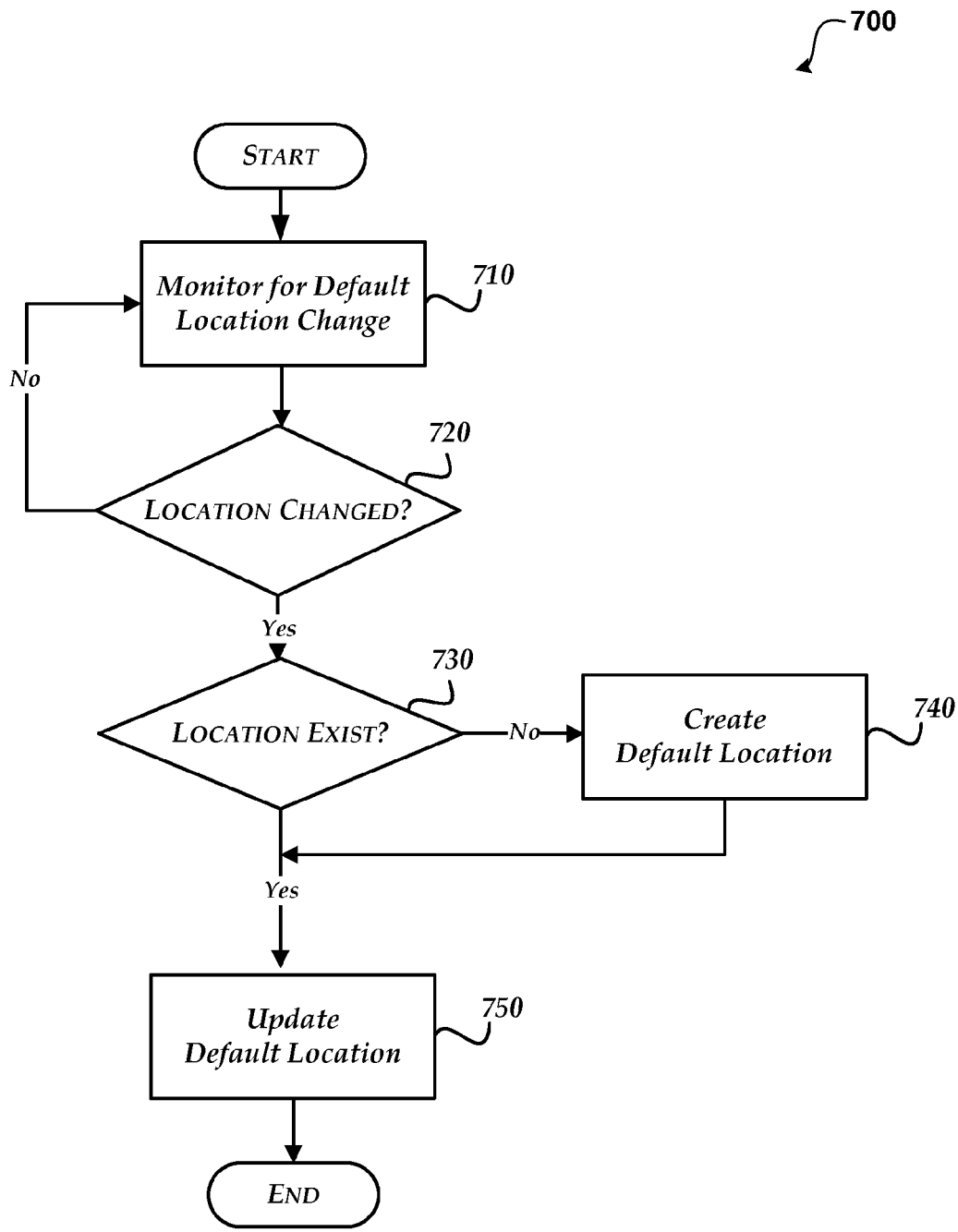
FIG. 7 illustrates a process for moving the default location.

Referring now to FIGS. 6 and 7, an illustrative process for providing a default location that may be dynamically changed will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 6 illustrates determining and writing to a default location. After a start operation, the process flows to operation 610, where the default location is determined According to one embodiment, determining the default location includes using an API call to request the current location of the default location. Other methods may be used to determine the default location. For example, according to another embodiment, the default location may be directly determined by accessing a registry key and retrieving the path to the default location. A process should determine the default location each time it interacts with the default location in case the default location has been changed.

Flowing to operation 620, once the default location is determined, the content may be sent to the default location for storage or the content that is already stored at the default location may be accessed. For example, a content icon as described in conjunction with FIG. 3 may access the default location.

The process then moves to operation 630 where the content may either be stored at the default location or the content may be retrieved from the default location. As discussed above, the default location may reside on the same computing device as the application receiving the content or it may reside on a separate computing device that is coupled to the application's computing device.

The process then moves to an end operation and returns to processing other actions.

FIG. 7 illustrates a process for moving the default location. After a start operation, the process flows to operation 710, where the default location is monitored for a change. According to one embodiment, a user may utilize a graphical user interface to move the location of the default location. According to another embodiment, a path may be manually changed within a file, such as by changing a registry key. Any method of changing the path to the default location, however, may be utilized.

Flowing to decision operation 720, a determination is made as to whether the default location has changed. When the default location has not changed, the process returns to operation 710 for continued monitoring.

When the default location has changed, the process moves to decision operation 730 where a determination is made as to whether the default location exists.

When the default location does not exist the process moves to operation 740 where the default location is created. For example, if a directory specified by the default location does not exist then that directory is created within the filing system's file structure. The process then moves to operation 750.

When the default location does exist the process moves to operation 750 where the default location is updated. According to one embodiment, updating the default location involves updating a registry key to the new path of the default location. Other methods may be used to update the default location. For example, the default location may be stored within a configuration file.

The process then moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for interacting with a default location for storing content, comprising:
    displaying a graphical user interface (GUI) used to update a location of the default location that is used by different applications to temporarily store content at the default location, and wherein a size of the default location changes in response to the different applications adding temporary content;

receiving a request through the GUI by at least one of the different applications to update the location of the default location;

receiving a save request through the GUI;

dynamically updating the location of the default location in response to the save request;

moving the content stored at the default location to the updated default location, wherein the different applications temporarily store content at the updated default location in response to updating the location of the default location; and directing any requests for the default location that are received after the update to the updated default location.

2. The method of claim 1, wherein the GUI includes an edit box that is configured to display a path that is associated with the location of the default location and that is configured to receive a change to the path.

3. The method of claim 1, wherein receiving the request through the GUI to update the location of the default location comprises determining when a default location is selected; determining a file location where the default location is moved and updating the location of the default location to the file location.

4. The method of claim 1, wherein the location of the default location is on a local computing device or on a remote computing device.

5. The method of claim 1, wherein receiving the request through the GUI occurs each time before new content is directed to be stored in the default location in addition to content previously stored in the default location.

6. The method of claim 1, further comprising receiving a dragging and dropping action that moves the default location to another location within a file system.

7. The method of claim 1, further comprising receiving an action that moves the default location to another location within a file system.

8. The method of claim 1, further comprising receiving a request for the default location comprises through an Application Programming Interface (API) that requests the default location.

9. A computer-readable storage medium having computer-executable instructions that, when executed by a processor, perform a method for interacting with a default location for storing content, the method comprising:

displaying a graphical user interface (GUI) used to update a location of the default location that is used by different applications to temporarily store content at the default location, and wherein a size of the default location changes in response to the different applications adding temporary content;

receiving a request through the GUI by at least one of the different applications to update the location of the default location;

receiving a selection of a save request;

dynamically updating the location of the default location in response to the save request;

moving the content stored at the default location to the updated default location, wherein the different application temporarily store content at the updated default location in response to updating the location of the default location; and directing any requests for the default location that are received after the update to the updated default location.

10. The computer-readable storage medium of claim 9, wherein the GUI includes an edit box that is configured to display a path that is associated with the location of the default location and that is configured to receive a change to the path.

11. The computer-readable storage medium of claim 9, wherein receiving the request through the GUI to update the location of the default location comprises determining when a default location is selected; determining a file location where the default location is moved and updating the location of the default location to the file location.

12. The computer-readable storage medium of claim 9, wherein the location of the default location is on a local computing device or on a remote computing device.

13. The computer-readable storage medium of claim 9, wherein receiving the request through the GUI occurs each time before new content is directed to be stored in the default location in addition to content previously stored in the default location.

14. The computer-readable storage medium of claim 9, the method further comprising receiving a dragging and dropping action that moves the default location to another location within a file system.

15. The computer-readable storage medium of claim 9, the method further comprising receiving an action that moves the default location to another location within a file system.

16. A system for handling default location that is dynamically changed, comprising:

a processor and a computer-readable storage medium;

an operating environment stored on the computer-readable storage medium and executing on the processor;

a display; and an application operating under the control of the operating environment and operative to perform actions, including:

displaying a graphical user interface (GUI) on the display used to update a location of the default location that is used by different applications to temporarily store content, and wherein a size of the default location changes in response to the different applications adding temporary content;

receiving a request through the GUI by at least one of the different applications to update the location of the default location;

receiving a selection of a save request;

dynamically updating the location of the default location in response to the save request;

moving the content stored at the default location to the updated default location, wherein the different applications temporarily store content at the updated default location in response to updating the location of the default location; and directing any requests for the default location that are received after the update to the updated default location.

17. The system of claim 16, wherein the GUI includes an edit box that is configured to display a path that is associated with the location of the default location and that is configured to receive a change to the path.

18. The system of claim 16, wherein receiving the request through the GUI to update the location of the default location comprises determining when a default location is selected; determining a file location where the default location is moved and updating the location of the default location to the file location.

19. The system of claim 16, further comprising receiving a dragging and dropping action that moves the default location to another location within a file system.

20. The system of claim 16, further comprising receiving an action that moves the default location to another location within a file system.

* * * * *